F. B. FOLEY.
BEARING GUARD.
APPLICATION FILED APR. 3, 1914.

1,161,465.

Patented Nov. 23, 1915.

WITNESSES

INVENTOR
F. B. FOLEY

UNITED STATES PATENT OFFICE.

FRANK BERNARD FOLEY, OF INGERSOLL, ONTARIO, CANADA.

BEARING-GUARD.

1,161,465.

Specification of Letters Patent.  Patented Nov. 23, 1915.

Application filed April 3, 1914. Serial No. 829,267.

*To all whom it may concern:*

Be it known that I, FRANK BERNARD FOLEY, of the town of Ingersoll, in the county of Oxford, in the Province of Ontario, Canada, have invented certain new and useful Improvements in Bearing-Guards, of which the following is the specification.

My invention relates to improvements in apple coring machines, and the object of the invention is to devise a revolving holder for the apple which will not be detrimentally affected by the fruit juice entering the bearings and it consists essentially of a supporting base, a rotatable prong carrying spindle, bearings carried by the supporting base in which the spindle is journaled and comprising a member carried by the shaft and members carried by the base such members co-acting together to form a closed bearing and packing means inserted therein adapted to obstruct the entrance of juice between bearing surfaces of such bearing, as hereinafter more particularly explained by the following specification.

Figure 1:
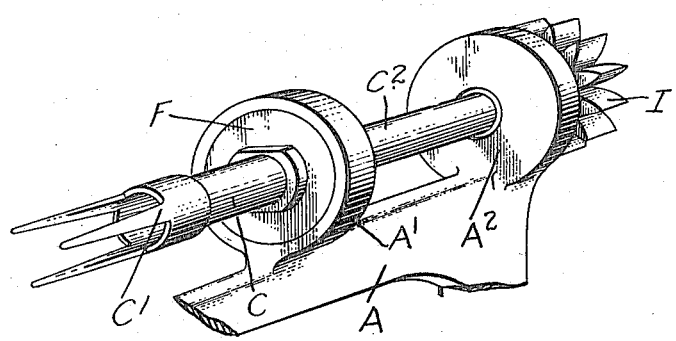
Figure 2:
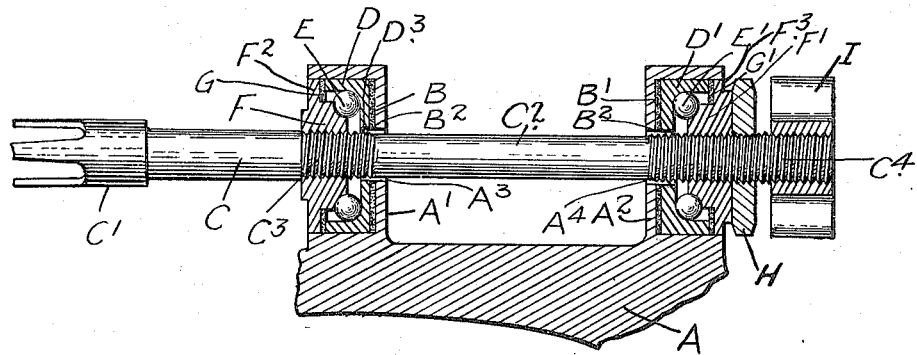

Figure 1, is a perspective view of my holder. Fig. 2, is a longitudinal section through the holder.

In the drawings like letters of reference indicate corresponding parts in each figure.

A is a base portion forming part of the main frame of the coring machine.

A' and A² are reversibly set main cups forming part of the base A and provided with central alined orifices A³ and A⁴.

B and B' are felt washers fitting into the cups A' and A², each having a central orifice B² registering with the orifices A³ and A⁴ of the cups.

C is a spindle carrying the usual prong end C' designed to be inserted in the apple. The spindle C is provided with a reduced portion C² extending through the orifices A³ and A⁴ of the cups. The reduced portion C² is provided with threaded portions C³ and C⁴.

D and D' are bearing cups fitting into the cups A' and A² against the washers B B' located in each cup A' and A². The cups D and D' are provided with threaded central orifices D³ to allow of the cups being inserted onto the threaded portions C³ and C⁴.

E and E' are ball bearings located in the cups D and D'.

F and F' are bearing cones which are threaded upon the threaded portions C³ and C⁴ against the balls. The cones F and F' are provided with annular flanges F² and F³ fitting into the cups A' and A².

G and G' are felt rings which fit into the cups A' and A² against the outer edges of the bearing cups D and D' and against which the inner face of the flanges F² and F³ of the cones F and F' bear.

H is a lock nut which is threaded onto the threaded portion C⁴ against the outer cone F'.

I is a driving gear also threaded and secured onto the threaded portion C⁴ of the spindle C.

In assembling my device the inner cone is threaded upon the threaded portion C³, a felt washer G is then placed into position against the flange F². The washer B is then inserted into the cup A'. The cup D is then inserted into the cup A' against the washer B and the spindle C² slipped through the orifices A³ and A⁴ so that the threaded portion C⁴ projects through the cup A². The felt washer D³ is then inserted into the cup A² and the cup D' inserted against the felt washer, the balls of the bearing are then placed into position and a cone F' carrying a felt washer G' similar to the felt washer G is threaded into the threaded portion C⁴ of the spindle against the ball bearings the lock nut H is then threaded into position.

In apple corers which have hitherto been in use the spindle has been rotatably held in a bearing sleeve provided with a sleeve bushing open at the ends and allowing of the free entrance of the juices flowing from the cut fruit which gradually works into the bearing, eating into the metal, and gradually loosening the shaft therein. This has the effect of allowing the shaft to move out of center and to allow it to travel in a circular path around such center having the final effect of cutting a gradually increasing size of hole in the apple and wasting more and more of the apple. In addition to this it resulted in splitting the smaller and softer apples and causing the paring knife used in this class of machine which operates on the rotating surface of the apple to break the peeling thereby causing the knife to skip long circumferential strips of peeling which necessitated such strip being removed by hand thereby wasting the fruit. It will also be seen that frequent renewals were necessary thus adding greatly to the operating expense of the machine. By my invention the juice is deflected radially by the member F forming the cone and away from the shaft, any small amount of juice which might pass between the members F and A' being stopped from further entrance to the bearing by the washer G and any which might enter between the shaft and member A' by the washer B. Thus the bearings are thoroughly protected from detrimental effect of fruit juices and therefore, always remain in perfect axial alinement enabling the corer which is a half round spoon to cut the same size core portion from the apple at all times. I am also enabled to peel a small and softer apple without splitting and yet allow the peeling knife to be set to take a thinner peeling thereby preventing wasting. I also provide a permanent bearing eliminating the necessity of renewals as in the case of the old style of sleeve bushing. The amount of power required to operate the machine is less and I also eliminate the troublesome feature of the coring spoon becoming engaged with the prongs of the apple holder while removing the core as with my construction the axis of the spindle is always central.

It will be seen from this description that I have provided a smooth running apple holder into the bearings of which juice will be prevented from entering by means of the washers G and B, G' and B' thus preventing the bearings being affected by the sticky or acid qualities of the juice.

Although in this description I have devised the bearings as ball bearings it will, of course, be understood that they may be roller bearings. Again although I show an adjustable jam nut for the cone it will be understood that I might use a set screw extending through the cone against the spindle C, but these are mere details of construction. I desire to say however, that changes may be made in such details without departing from the spirit of my invention. It is necessary, however, that the bearings carrying the spindle $C^2$ should have the bearing surfaces remote from the spindle thereby avoiding any liability of the acid juice passing along the spindle and into the bearings.

What I claim as my invention is.

In an apple paring and coring machine, a base, a cup having a central opening secured to the base, a bearing cup having a central opening mounted in the cup on the base, an absorbent packing washer having a central opening interposed between said bearing cup and the cup on the base, the openings in said bearing cup, washer and cup on the base being in alinement, a shaft extending through such alined openings, a bearing cone threaded upon said shaft and provided with an annular outstanding flange adapted to fit within the cup on said base, balls interposed between said bearing cup and cone, and an absorbent packing washer interposed between the outstanding flange of said bearing cone and the flange of said bearing cup.

FRANK BERNARD FOLEY.

Witnesses:
JOHN L. PATERSON,
MARY HOWE.

Copies of this patent may be obtained for five cents each, by addressing the "Commissioner of Patents, Washington, D. C."